Feb. 7, 1933.    D. F. NEWMAN    1,896,849
FREEZING TRAY
Filed April 13, 1931
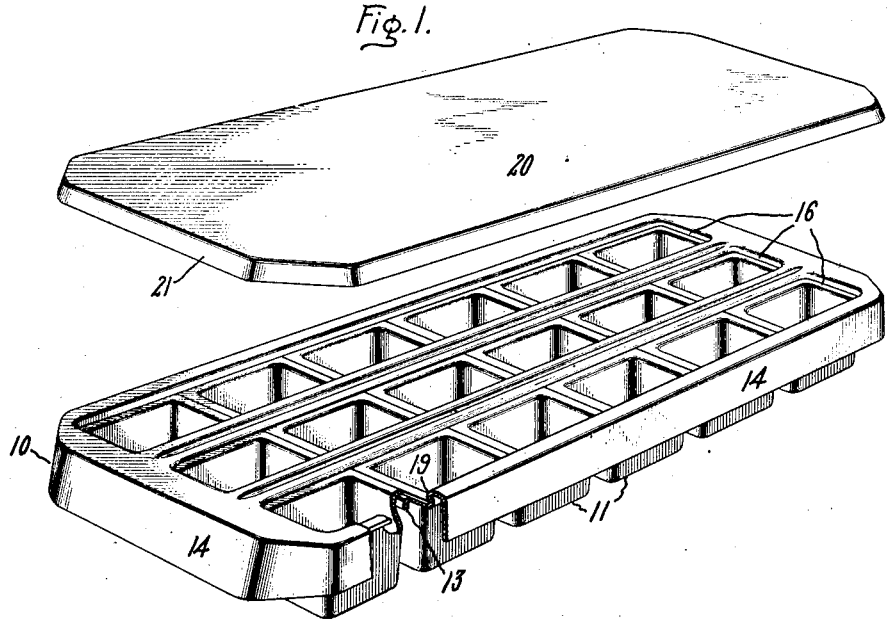
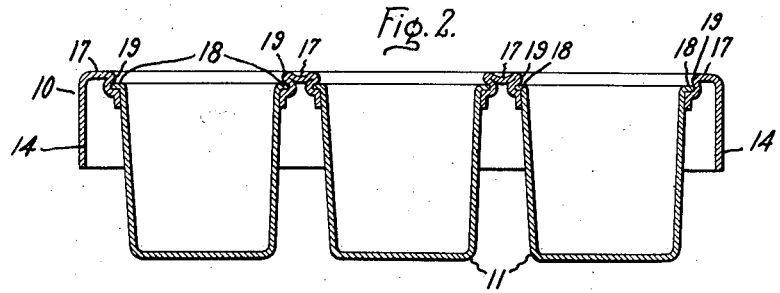
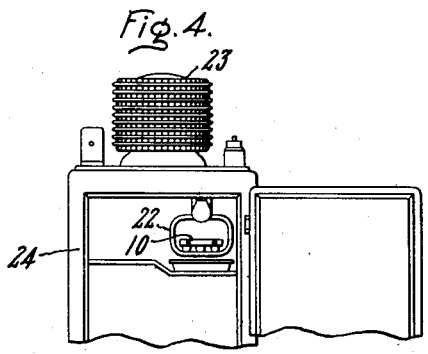
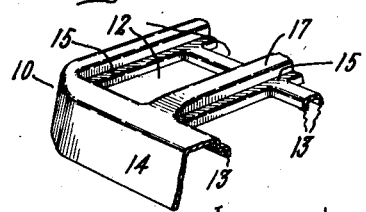
Inventor:
Delbert F. Newman,
by Charles E. Tuller
His Attorney.

Patented Feb. 7, 1933

1,896,849

UNITED STATES PATENT OFFICE

DELBERT F. NEWMAN, OF SCHENECTADY, NEW YORK ASSIGNOR TO GENERAL ELECTRIC COMPANY, A CORPORATION OF NEW YORK

FREEZING TRAY

Application filed April 13, 1931. Serial No. 529,689.

My invention relates to freezing trays of the type ordinarily employed in the cooling units of refrigerators forming part of the refrigerating systems for cooling them.

It has been proposed heretofore to provide a freezing tray with a plurality of separate cups, but the method employed in securing the cups together has involved considerable difficulty in manufacture. Furthermore, when these trays were placed in the cooling unit they usually became frozen to the surface thereof and when the freezing trays were removed from the cooling unit, they frequently became distorted so that when the freezing tray was subsequently placed in the cooling unit the cups were not in good thermal contact with the surface of the cooling unit.

The object of my invention is to provide a freezing tray construction which can be readily fabricated of pressed metal parts and which will be of rigid construction, so that the bottoms of the cups of the freezing tray will always be in good thermal contact with the surface of the cooling unit in which it is placed. I accomplish this by providing a freezing tray including a frame having a plurality of openings therein and a plurality of cups in the openings in the frame below the upper surface thereof, the frame being formed about the cups to secure them therein.

My invention will be more fully set forth in the following description referring to the accompanying drawing, and the features of novelty which characterize my invention will be pointed out with particularity in the claims annexed to and forming part of this specification.

In the drawing, Fig. 1 is a perspective view of a freezing tray embodying my invention and a cover therefor, partly broken away to more clearly show the construction; Fig. 2 is a transverse section of the freezing tray shown in Fig. 1; Fig. 3 is a fragmentary perspective view of the pressed metal frame in an intermediate stage of its manufacture, and Fig. 4 is a front elevation of a refrigerator cabinet provided with a cooling unit in which my improved freezing tray is arranged.

Referring to the drawing, the freezing tray which I have illustrated embodying my invention includes a supporting frame 10 having a plurality of separate cups 11 secured therein. In order to provide a rigid frame construction which can be readily pressed from sheet metal in such manner as to facilitate securing the cups therein, I first form the frame with a plurality of openings 12 having flanges 13 extending about each of the openings and a flange 14 extending entirely about the frame. The portion of the frame about the openings is depressed, as indicated at 15, below the upper surface of the frame as shown in Fig. 3. A plurality of rows of openings are formed in the frame in this way as indicated at 16, so that the portions 17 of the frame at the sides of the rows of openings extend above the cups. I then arrange the cups 11 in the openings which closely fit the openings and are provided with flanges 18, which rest on the depressed portion 15 of the frame and abut the adjacent portions of the frame and the flanges of the adjacent cups. The cups 11 are preferably tapered to facilitate removal of the substance frozen therein. I then place the cups and the frame in a press having suitable dies which extend about the rows of cups and press the portion of the frame at the sides and ends of the rows of cups so that they extend over the flanges 18 of the cups as indicated at 19 and secure the cups in the frame. I also preferably provide a pressed metal cover 20 having a downwturned flange 21 which fits the outer flange 14 of the cups.

By constructing the freezing tray as above described a very rigid construction is provided in which the separate cups are very firmly secured in the frame. Moreover, all of the steps of manufacture of the freezing tray can be readily carried out in metal presses, so that the soldered or welded joints which are difficult to make in a construction of this kind are entirely avoided.

When it is desired to freeze water or other substances in the tray, the tray is placed on the surface of the cooling unit 22 which forms a part of the refrigerating system having a compressor and condenser unit at 23 which cools the refrigerator cabinet 24. When the freezing tray is removed from the cooling unit, it will be found that the tray is sufficiently rigid to prevent its being distorted if the tray is pried loose from the cooling unit, to which it is frozen. The tray with the cover 20 is then inverted and water can be directed over the bottoms of the cups which will be retained about them by the flange 14. This will very quickly thaw the surface of the blocks in contact with the cups so that they will drop out of the cups upon the cover, and the tray can then be removed.

Although I have disclosed a particular embodiment of my invention, I do not desire to be limited thereto, and I intend in the appended claims to cover all modifications which do not depart from the spirit and scope of my invention.

What I claim as new and desire to secure by Letters Patent of the United States, is:

1. A freezing tray comprising a frame having a plurality of openings therein, the portion of said frame about the openings therein being depressed below the upper surface thereof, and a plurality of cups in the openings in said frame below the upper surface thereof, said frame having longitudinal portions on opposite sides of said cups formed to retain them in said frame.

2. A freezing tray comprising a frame having a plurality of openings therein and downturned flanges about the openings, the portion of said frame about the openings being depressed below the upper surface of said frame, and a plurality of cups having flanges about their upper edges arranged in the openings in said frame and abutting the flanges of the adjacent cups and said frame, said frame being formed to extend about the adjacent upper edges of the flanges of said cups to secure them in said frame.

In witness whereof I have hereunto set my hand.

DELBERT F. NEWMAN.